United States Patent [19]

Wallisser

[11] Patent Number: 4,908,953
[45] Date of Patent: Mar. 20, 1990

[54] LENGTH MEASURING DEVICE FOR MILLING MACHINES, SAWING MACHINES AND SIMILAR MACHINES

[76] Inventor: Klaus Wallisser, Hanfwiesenstr. 17, 7060 Schorndorf, Fed. Rep. of Germany

[21] Appl. No.: 100,394

[22] Filed: Sep. 24, 1987

[30] Foreign Application Priority Data

Sep. 24, 1986 [DE] Fed. Rep. of Germany ....... 3632497

[51] Int. Cl.⁴ ............................................. B26D 7/28
[52] U.S. Cl. ......................................... 33/701; 33/706
[58] Field of Search ............. 33/125 R, 125 A, 125 C, 33/166, 626, 630, 631, 700, 706, 707, 701

[56] References Cited

U.S. PATENT DOCUMENTS 3,811,196  5/1974  Smith ..................................... 33/630

Primary Examiner—L. T. Hix
Assistant Examiner—Brian W. Brown
Attorney, Agent, or Firm—Edwin E. Griegg

[57] ABSTRACT

The invention refers to a length measuring device, with which a working length of a work piece may be determined for milling machines and sawing machines. The measuring device comprises one unit with a movable buffer which is laid out and secured parallel to the table on a level and vertical to the cutting tool of the machine. An electrical sensor device operable relative to an electrical ruler is synchronized to move with the buffer and the sensor device is electrically connected with an indicator to provide a read out of the measurement.

8 Claims, 2 Drawing Sheets

LENGTH MEASURING DEVICE FOR MILLING MACHINES, SAWING MACHINES AND SIMILAR MACHINES

BACKGROUND OF THE INVENTION

The invention is directed to a device for measuring length for milling machines, sawing machines and similar machines, in other words a measuring device for adjusting milling or sawing length of a work piece.

Manual adjustment of machinery of the above mentioned type to exact working tolerances is generally extremely time consuming and prone to various mistakes and errors. As long as a big series of pieces are concerned, one has a certain time available for adjustment and for correction of possible mistakes, since the new adjustment is valid for a big number of pieces and therefore cost-effective. As fas as individual pieces or small series of pieces are concerned, an error in measuring may represent a total loss. Therefore, it is desirable to create a device by which manual adjustment and therefore adjustment or measuring mistakes are practically impossible.

An object of the invention is to provide a device for a mechanical adjustment of milling or sawing measurements at the corresponding machinery.

The invention is based on the task of developing a buffer that can be fixed on the tooling base and comprises a base that can be moved parallel to the tool base and vertical to the tool. Another integrated part is an electrically checked scale, parallel to the moving direction of the buffer which is mounted on the base. Its electronic measuring device is movable in a synchronized way and always parallel to the buffer, and it is also connected electrically with an indicator guage.

It is advantageous to mount the buffer in a guide on an arm, at the extreme end, the guide itself is movable on two guide rails, which rest in two end pieces. Through the guide, a movable spindle reaches parallel to the guide rails through which the guide can be moved.

The spindle can be adjusted manually or by an electric motor. The adjustment for zero and the length adjustment of the measurements can also be operated through computers. This means that the operator only has to push the corresponding function buttons of the computer equipment, after the measuring device is fixed on the work table.

The advantages of the invention are self-evident. Instead of a long and tiresome adjustment of slide of measuring length with a sliding caliper which also includes possible errors, the new measuring device allows a quick, secure and precise adjustment of working length of the tools. These advantages also prevail in small quantities, since the adjustment of a new length can be executed quick and without any problems.

Additional advantages may be gathered from a subsequent description of the figures as well as from the claims. They can also be deducted from the following description of an execution example.

DESCRIPTION OF THE PREFERRED EMBODIMENTS

Figure 1:
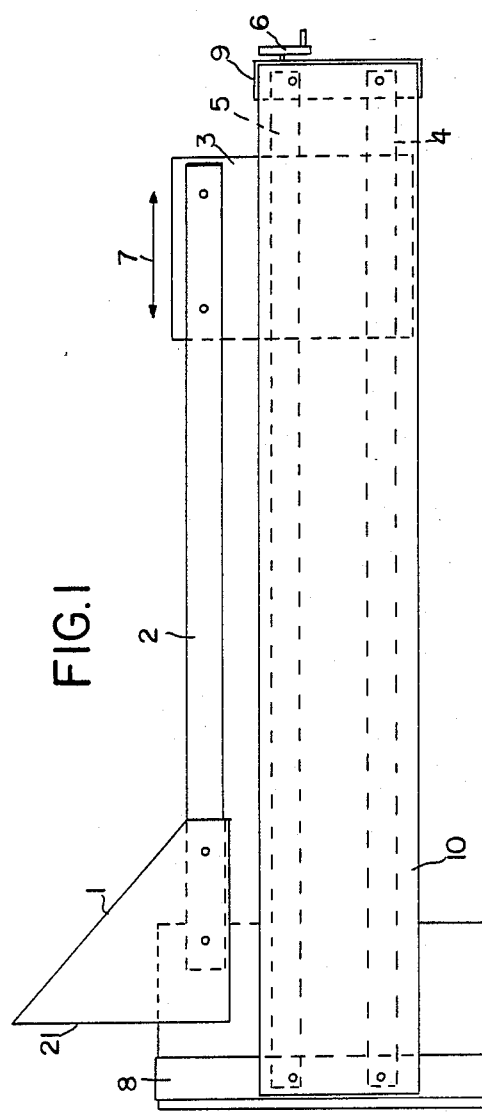
FIG. 1 illustrates a top view of the new measuring device.
Figure 2:
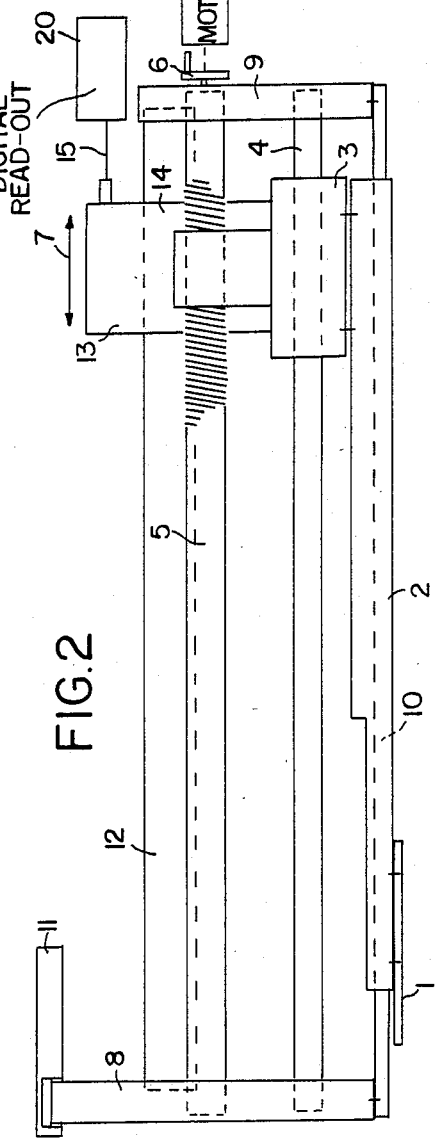
FIG. 2 illustrates a view of the measuring device in a direction of the arrow of FIG. 1.
Figure 4:
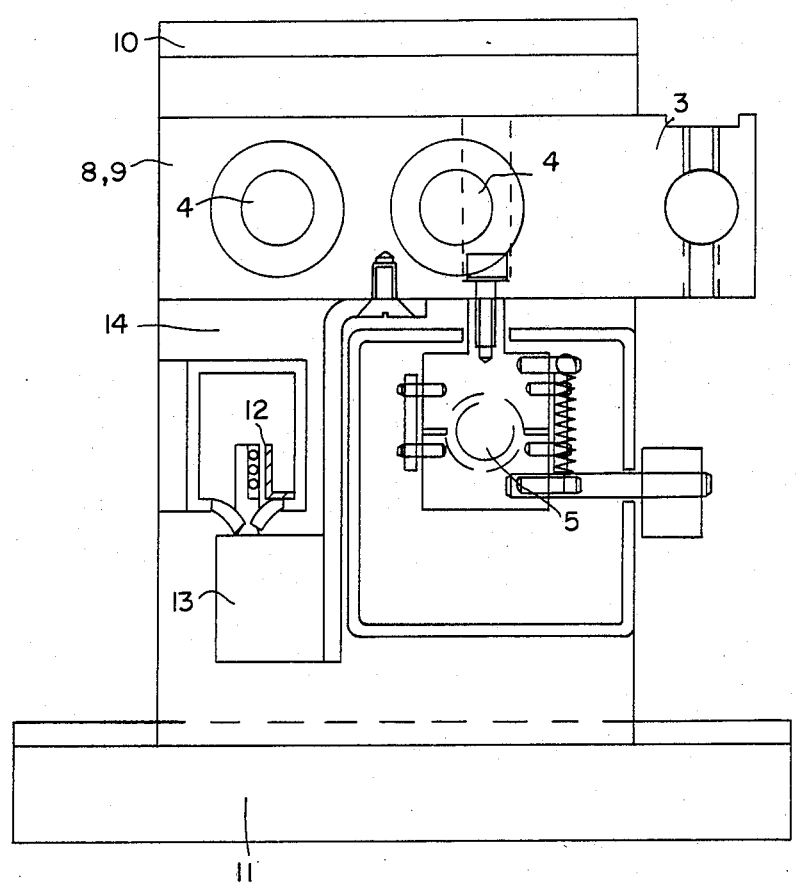
FIG. 4 illustrates a cross sectional view.

FIG. 1 and FIG. 2 shows the new measuring device in two views. The buffer 1, which is important for the measuring position, is fixed to the arm 2, which itself is fixedly connected with slide 3. Slide 3 is located on spaced guide rails 4, parallel to arm 2 and also parallel to a threaded spindle 5 which can adjust the spindle manually via a hand wheel 6. By rotating spindle 5, slide 3 can be adjusted and moved in a direction of double-arrow 7.

Both parallel guide rails 4 and spindle 5 are secured at their ends in both end pieces 8 and 9, which themselves forms a rigid unit through a connecting rail 10. A base 11 is fixed to the left end piece 8 upon which the complete measuring device can be attached to the working table of the operating machine and also can be adjusted.

On the bottom part of the measuring device the length measuring equipment can be found which comprises a known glass measuring beam electronically readable ruler 12, such as an ACU-RITE III digital read-out system, manufactured by ACU-RITE Incorporated, 890 East Second Street, Jamestown, N.Y. 14701. Roller 13, together with a sensor device which is located along the glass measuring beam 12 is fixedly connected through support strip 14 with slide 3, so that it can be adjusted in a synchronized way and or always together with measuring buffer 1. The sensor device is connected through an electric cable 15 with a digital readout 20, shown by a block.

The adjustment of a new measuring length for milling an object will now be described.

For this measurement the measuring device is secured onto the milling machine with the measuring device parallel with and on a level with the direction of movement of the work piece to be measured and fixed in this position through suitable devices like grooves, sliding blocks, screws or any other suitable manner. Through cable 15, the sensor device of the glass measuring beam 12 will be connected with the digital read-out instrument. The measuring device then must be adjusted in a zero-position. For zero-position, the buffer 1 is moved by arm 2 towards the milling tool until the buffer reaches the milling tool, then the read-out will be corrected to the zero-position. Now the measuring device which remains on the working table of the machine is ready for application.

For a milling operation, arm 2 together with buffer 1 will be moved away from the milling tool until the read-out shows a correct working length. The work piece for the operation will be set in a way, so that it touches end 21 of the buffer 1. After that as many work pieces as desired can be processed without a necessity of checking measurements.

It should be obvious to one skilled in the art that, in securing the measuring device to the work table for measuring long pieces, the slide 3 with the arm 2 and buffer attached would be moved completely to the left of the measuring device, looking toward FIG. 2. The edge 21 is aligned with the saw blade or milling tool, then the measuring device is fixedly secured to the work table of the milling machine. The measuring instrument is set at zero, then the slide 3 is moved to the right, looking at FIG. 2, until the correct measure has been reached. The work piece to be cut will then be moved toward the edge 21 of the buffer until the buffer is touched. The piece to be cut will then be at the proper length.

Placing the measuring device into the zero-position and adjusting the measurements can also be realized with a suitable electric motor instead of doing it manually. Also in this case it is possible to provide measurement instructions directly through a computer which in turn will operate the motor to move the arm 2 and along with it the buffer 1.

Figure 3:
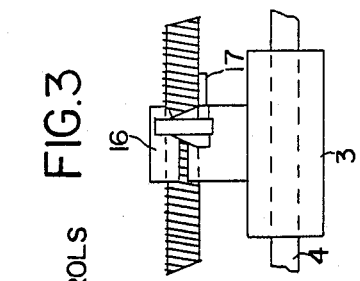
FIG. 3 illustrates the execution of the slide as disconnection ratchet.

FIG. 3 shows a special formation of slide 3. Here the important part of slide 3 through which spindle 5 is threaded is formed as connection ratchet 16 for unlocking the thread guide from the slide. For disconnecting the unit, ratchet lever 17 is pushed in a direction of guide rail 4 in a disconnected state. Slide 3 and together with it arm 2 and buffer 1 can be coarsely adjusted, respectively, this represents a quick adjustment for greater lengths and distances.

The foregoing relates to preferred exemplary embodiments of the invention, it being understood that other variants and embodiments thereof are possible within the spirit and scope of the invention, the latter being defined by the appended claims.

What is claimed and desired to be secured by Letters of Patent of the United States is:

1. A measuring device for determining a working length of a work piece to be milled by a milling machine or sawed by a sawing machine which comprises: a support base (1) which can be fixedly secured to an upper surface of a work table or fixedly secured to a milling machine parallel with an upper surface of a work table; said measuring device includes spaced parallel end pieces (8 and 9) with one of said end pieces secured to said support base (1); a connecting rail 10 secured at one end to said one end piece (8) and at its opposite end to the other of said end pieces (9), to fix said end pieces (8 and 9) in spaced parallel relationship with each other; parallel spaced guide rails (4) fixedly secured at opposite ends to said end pieces (8 and 9) parallel with said connecting rail (10); a threaded spindle (5) fixedly secured at each end thereof to said end pieces (8,9) against axial movement but with freedom of rotational movement, said threaded spindle (5) being parallel with said guide rails (4) and said connecting rail (10); a measurement slide (3) secured on said guide rails for freedom of movement relative to said guide rails and secured to said threaded spindle (5) for an adjustable movement with respect to said threaded spindle; an arm (2) secured at one end thereof to said measurement slide in parallel relationship with said threaded spindle (5), said spaced guide rails (4) and said connecting rail (10); said arm (2) having a non-connected end to which a buffer (1) is connected and from which a portion of said buffer extends; said buffer having one surface thereof which is parallel with said one end piece (8); and an adjustable measurement indicating means associated with said buffer (1) and said measurement slide, said adjustable measurement indicating means being adjustable between a zero reading with said buffer in a desired position, to any desired measure reading with movement of said buffer and said measurement slide from said zero reading to a desired position for a desired measurement.

2. A measurement device as set forth in claim 1, in which said adjustable measurment indicating means is an electronically readable ruler (12) secured between said end plates (8 and 9) parallel with said arm (2); said electronically readable ruler includes a sensor device moveable along said readable ruler and fixedly secured to said measurement slide (3) such that said sensor device is movable along said electronically readable ruler as said buffer (1) is adjusted relative to said electronically readable ruler for measurement of a length of a piece of work to be milled or cut; and a readout device secured to said sensor device for indicating a measurement due to simultaneous movement of said sensor device, said measurement slide (3) and said buffer from a zero setting to a desired measurement setting.

3. A measuring device according to claim 1, in which said slide (3) is manually movable along said spindle by a hand wheel (6).

4. A measuring device according to claim 1, in which said slide (3) is moved by means of a motor.

5. A measuring device according to claim 1, in which said slide (3), through which spindle (5) is fed is disconnectable from said spindle for movement there along by a ratchet.

6. A method of measuring the length of a work piece for a milling or cutting machine which comprises:
assembling a measuring device including a supporting base, a pair of spaced, parallel end plates with one of said pair of end plates secured to said supporting base, a connecting rail (10) that secures said end plates in a spaced, parallel relationship, parallel spaced guide rails (4) fixedly secured at either ends to said end plates, a threaded spindle fixedly secured against axial movement at its ends to said end plates but for rotational movement relative to said end plates, a measurement slide mounted on said spaced guide rails and said threaded spindle for adjustable movement along said threaded spindle, an arm (2) secured at one end to said measurement slide for movement therewith, a buffer secured to an end of said arm for movement therewith, a measurement means secured between said end plates relative to said measurement slide and said buffer, the method comprising, securing said supporting base of said measuring device onto an upper surface of a work table or to a milling or cutting machine with said arm and said measuring means parallel with an alignment of a work piece to be milled or cut by a millig device or a saw, moving said milling device or saw to a position in which said work piece is to be milled or cut, moving said buffer up agnst said milling device or saw, adjusting said measuring device to a zero measurement reading, moving said buffer and measuring means in a direction of movement of a work piece to be milled or cut to a position for a desired length of the work piece relative to a path of said milling device or saw and fixing said buffer in the desired measurement position whereby successive pieces of work will be milled or cut to provide a uniform measured length.

7. A method as set forth in claim 6, which includes an indicator connected with said sensor for indicating a measurement from zero to the desired measurement.

8. A method as set forth in claim 7, in which the sensor is an electronic sensing device.

* * * * *